(12) United States Patent
Niimi et al.

(10) Patent No.: US 6,566,780 B2
(45) Date of Patent: May 20, 2003

(54) ROTARY ELECTRIC MACHINE HAVING REINFORCING RING ON ARMATURE

(75) Inventors: Masami Niimi, Handa (JP); Shinichi Umemura, Anjo (JP)

(73) Assignee: Denso Corporation, Kariya (JP)

( * ) Notice: Subject to any disclaimer, the term of this patent is extended or adjusted under 35 U.S.C. 154(b) by 26 days.

(21) Appl. No.: 09/987,731

(22) Filed: Nov. 15, 2001

(65) Prior Publication Data

US 2002/0079776 A1 Jun. 27, 2002

(30) Foreign Application Priority Data

Dec. 25, 2000 (JP) ........................... 2000-392318

(51) Int. Cl.⁷ ................................................ H02K 3/34
(52) U.S. Cl. .......................................... 310/215; 310/271
(58) Field of Search ................................ 310/214, 215, 310/270, 271, 260, 261; 29/596–598, 734; 174/137 R, 138 E, 138 R, 72 A

(56) References Cited

U.S. PATENT DOCUMENTS

| | | | |
|---|---|---|---|
| 3,047,756 A | * 7/1962 | Coggelshall | 310/215 |
| 3,179,828 A | * 4/1965 | Apking et al. | 310/215 |
| 4,400,639 A | * 8/1983 | Kobayashi et al. | 310/215 |
| 4,786,835 A | * 11/1988 | Bode et al. | 310/234 |
| 5,473,213 A | * 12/1995 | Kahle, Sr. | 310/270 |
| 6,064,136 A | * 5/2000 | Kobayashi et al. | 310/271 |

FOREIGN PATENT DOCUMENTS

| JP | 54007501 | * 1/1979 |
|---|---|---|
| JP | 58-90047 U | 6/1983 |

* cited by examiner

Primary Examiner—Tran Nguyen
(74) Attorney, Agent, or Firm—Oliff & Berridge, PLC

(57) ABSTRACT

In an armature, a slot insulation paper provided in a slot of an armature core protrudes from an insulation plate in the axial direction. A part of the slot insulation paper that faces an outer peripheral surface of a coil end is cut out to expose the outer peripheral surface of the coil end. A reinforcing ring is fitted at the axial outside of the armature core to surround the exposed outer peripheral surface of the coil end. Accordingly, the reinforcing ring is disposed close to the armature core in the axial direction. Therefore, a straight portion of the coil end is shortened by an amount of cut of the slot insulation paper, and as a result, the axial length of the armature is shortened.

7 Claims, 2 Drawing Sheets

ROTARY ELECTRIC MACHINE HAVING REINFORCING RING ON ARMATURE

CROSS REFERENCE TO RELATED APPLICATION

This application relates to and incorporates herein by reference Japanese Patent Application No. 2000-392318 filed on Dec. 25, 2000.

BACKGROUND OF THE INVENTION

1. Field of the Invention

The present invention relates to a rotary electric machine having a reinforcing ring on an armature.

2. Description of Related Art

It is proposed to fit a reinforcing ring on the outer periphery of an armature coil end, which protrudes from an end surface of an armature core in an axial direction, to protect the armature coil from centrifugal force. For example, in an armature 100 shown in FIG. 5, a reinforcing ring 130 is fitted on an armature coil 110 axially outside of a slot insulation paper 140 without over lapping the slot insulation paper 140. When the reinforcing ring 130 is fitted on the slot insulation paper 140 that protrudes from the side surface of the armature core 120 in the axial direction, the coil end is likely to expand in a radially outside direction due to centrifugal force by compressing the slot insulation paper 140. Therefore, it is necessary to provide a straight portion within the coil end for fitting the reinforcing ring 130 axially outside of the slot insulation paper 140 without overlapping. As a result, the axial length of the armature 100 is increased.

However, in order to downsize the rotary electric machine, it is needed to shorten the axial length of the coil end as much as possible because the coil end does not contribute to performance. Thus, mounting method of the reinforcing ring 130 must be improved to meet this requirement.

SUMMARY OF THE INVENTION

The present invention is made in view of the above problem and it is an object to provide a rotary electric machine which has a reinforcing ring on an armature and suitable for downsizing.

In an armature of the present invention, a slot insulation paper provided underneath an armature coil has a shorter axial length at an outer peripheral side of a coil end of the armature coil than at an inner peripheral side of the coil end to provide an exposed surface of the coil end at the outer peripheral side. A reinforcing ring is fitted on the exposed surface.

As compared with other armatures in which the reinforcing ring is mounted axially outside of the slot insulation paper that protrudes from the axial side surface of an armature core in the axial direction, a mounting position of the reinforcing ring is made closer to the armature core side so that the straight portion of the coil end is shortened. As a result, an axial length of the armature is shortened.

Further, a resin insulator is filled in a clearance between the exposed coil end and the reinforcing ring. Thus, it is unnecessary to accurately manage the inner diameter of the reinforcing ring.

In addition, the reinforcing ring is press-fitted in direct contact with the exposed surface of the coil end. Accordingly, the armature coil can be strengthened against the centrifugal force.

BRIEF DESCRIPTION OF THE DRAWINGS

Other objects, features and advantages of the present invention will become more apparent from the following detailed description made with reference to the accompanying drawings.

In the drawings.

DETAILED DESCRIPTION OF PREFERRED EMBODIMENTS (First Embodiment)

Figure 1:
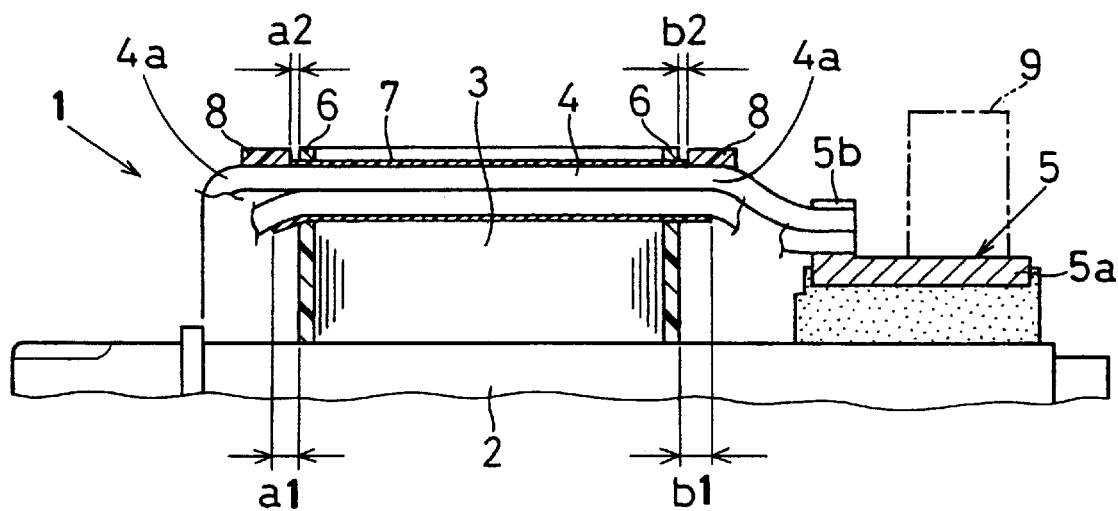
FIG. 1 is a semi-cross-sectional view of an armature of a rotary electric machine according to a first embodiment of the present invention.

An armature of the present embodiment is, for example, used within a starting motor mounted on a starter for a vehicle. As shown in FIG. 1, an armature 1 is constructed of a rotary shaft 2, an armature core 3, armature coils 4, a commutator 5 and the like.

The armature core 3 is constructed by stacking a plurality of steel plates that are pressed to have an identical shape, and press-fitted to the rotary shaft 2. The armature core 3 has a plurality of slots 3a for housing the armature coils 4 in a peripheral direction. Insulation plates 6 are fitted against both of the axial side surfaces of the armature core 3. The armature coil 4 is installed in the slot 3a through a slot insulation paper 7 (described later), and has coil ends 4a protruding axially outside the slot 3a from both of the axial side surfaces of the armature core 3. The outer peripheral side of the armature coil 4 is continued to the inner peripheral side of the armature coil 4 installed in one of the slots 3a. Also, the inner peripheral side of the armature coil 4 is continued from the outer peripheral side of the armature coil 4 installed in an another of the slots 3a. A reinforcing ring 8 is mounted on the outer periphery of the coil ends 3a for protecting the armature coils 4 from centrifugal force.

The commutator 5 is constructed by arranging a plurality of commutator segments 5a into a cylindrical-shape at the end of the rotary shaft 2. The commutator segment 5a has a riser bar 5b to electrically and mechanically connect to the end of the armature coil 4. Further, brushes 9 are arranged to slide-contact the outer peripheral surface of the commutator 5 during rotation of the armature.

Figure 2:
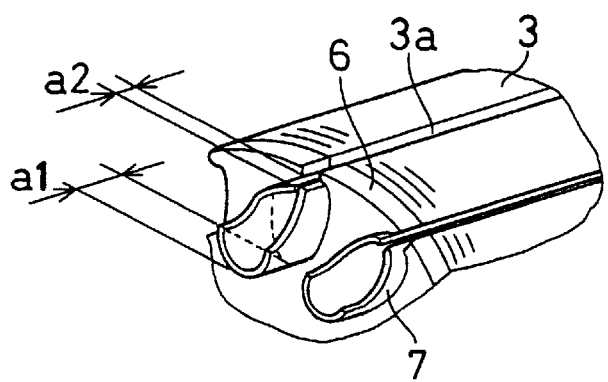
FIG. 2 is a perspective view showing a configuration of a slot insulation paper protruding from an axial end of an armature core.

The slot insulation paper 7 is installed in the slot 3a for insulating the armature core 3 and the armature coil 4 from each other. The length of the insulation paper 7 in the axial direction is longer than a total length adding up the entire axial length of the armature core 3 and thicknesses of two insulation plates 6 in the axial direction. As shown in FIGS. 1 and 2, both axial side ends of the insulation paper 7 protrude axially outside from the insulation plates 6 for having appropriate lengths a1 and b1, respectively. Yet, a part of the slot insulation paper 7 which corresponds to the outer periphery of the coil ends 3a is cut out so that the insulation paper 7 protrudes for lengths a2 and b2 from the insulation plates 6 in the axial direction at the outer peripheral side of the coil end 4a. The protrusion lengths a2 and b2 are shorter than the length a1 and b1 of the inner peripheral side. Also, it is not always necessary to protrude the slot insulation paper 7 from the insulation plate 6 in the axial direction at the outer peripheral side of the coil end 4a. Therefore, the axial length of the slot insulation paper 7 at the outer peripheral side of the armature coil 4 may be equal to the total length adding up the entire axial length of the armature core 3 and the thicknesses of two insulation plates 6 in the axial direction. That is, the lengths a2 and b2 may be zero.

Figure 3A:
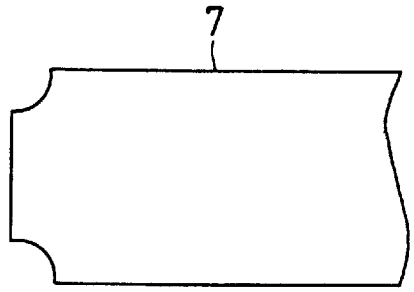
FIGS. 3A and 3B are unfolded views of the slot insulation papers.
Figure 3B:
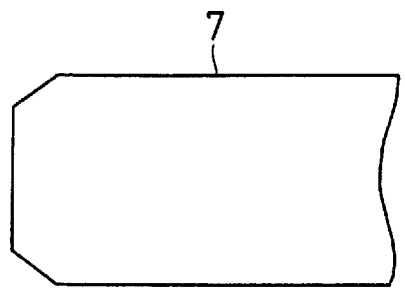

As shown in FIGS. 3A and 3B, the slot insulation paper 7 is generally shaped in a rectangular form and cut out at both side corners in the width direction (up-down direction in FIGS. 3A and 3B) to have an arc shape or straight, for instance. Cutting shape of both side corners of the slot insulation paper 7 is not limited to those as shown in the figures.

As shown in FIG. 1, the reinforcing ring 8 is mounted to surround the outer peripheral surfaces of the coil ends 4a that are exposed from the slot insulation paper 7. Here, each coil end 4a includes a straight portion for receiving the reinforcing ring 8. The straight portion has a predetermined length in the axial direction and the outer diameter thereof is substantially fixed. The reinforcing ring 8 is, for example, made of resin and formed into a cylindrical-shape having the predetermined width. The reinforcing ring 8 is press-fitted on the exposed outer peripheral surfaces of the coil ends 4a.

According to the armature 1 of the present embodiment, the reinforcing ring 8 is fitted on the coil ends 4a where the slot insulation paper 7 is cut out to expose the outer peripheral surface of the coil ends 4a. Therefore, the reinforcing ring 8 is fitted close to the armature core 3. Accordingly, the straight portion of the coil end 4a is shortened for a cut amount of the slot insulation paper 7 so that the armature 1 is shortened in the axial direction. Further, deformation of the coil end 4a due to centrifugal force is decreased in accordance to the shortening of the axial length of the armature coil 4. Therefore, the present invention is suitable for motors rotating at high speeds.

Further, since the reinforcing ring 8 is press-fitted directly on the outer peripheral surface of the coil end 4a without through the slot insulation paper 7, a clearance between the coil end 4a and the reinforcing ring 8 is reduced. Thus, the armature coil 4 increases strength against the centrifugal force.

In addition, since the reinforcing ring 8 is directly fitted on the exposed the coil end 4a without overlapping with the slot insulation paper 7, it is decreased that the slot insulation paper 7 protruding axially outside of the insulation plate 6 is crumpled or torn by fitting the reinforcing ring 8. Thus, the reinforcing ring 8 is easily fitted in the axial direction.

Here, it is unnecessary to entirely cut out the slot insulation paper 7 that protrudes from the end surface of the insulation plate 6. It is preferable to cut out the slot insulation paper 7 at least to expose the outer peripheral surface of the coil ends 4a. In other words, it is unnecessary to cut out the slot insulation paper 7 that corresponds to the inner peripheral side of the coil end 4a. Accordingly, the inner peripheral side of the coil end 4a where the brush powder readily enters and adheres is surrounded with the slot insulation paper 7, thereby ensuring insulation.

(Second Embodiment)

Figure 4:
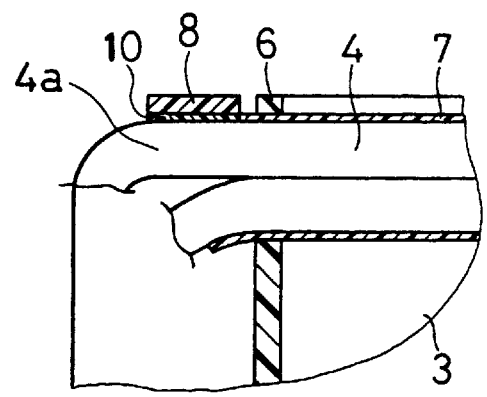
FIG. 4 is a cross-sectional view of a coil end where a reinforcing ring is fitted and a resin insulator is filled between the coil end and the reinforcing ring, according to a second embodiment.
Figure 5:
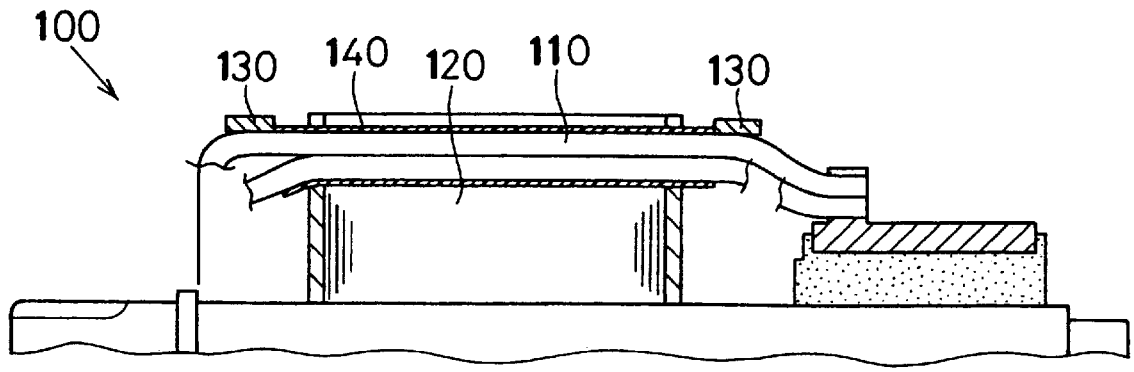
FIG. 5 is a semi-cross-sectional view of an armature according to the related art.

As shown in FIG. 4, in a second embodiment, a resin insulator 10 may be provided between the coil end 4a and the reinforcing ring 8. The resin insulator 10 is, for example, made of epoxy resin (thermosetting resin) and used to fill out a clearance between the coil end 4a and the reinforcing ring 8. Therefore, it is unnecessary to accurately manage the inner diameter of the reinforcing ring 8. In addition to the effects of the first embodiment, the reinforcing ring 8 is produced at low cost.

The present invention should not be limited to the disclosed embodiments, but may be implemented in other ways without departing from the spirit of the invention.

What is claimed is:

1. A rotary electric machine comprising:

an armature core having a plurality of slots;

an armature coil installed in each slot and having a coil end that protrudes from the armature core in an axial direction;

a slot insulation paper provided underneath the armature coil in each slot for insulating the armature core and the armature coil from each other; and a reinforcing ring fitted on an outer periphery of the coil end, wherein the slot insulation paper has a shorter axial length at an outer peripheral side of the coil end than an axial length at an inner peripheral side of the coil end to provide an exposed surface of the coil end at the outer peripheral side; and wherein the reinforcing ring is fitted on the exposed surface of the coil end.

2. The rotary electric machine as in claim 1, wherein the slot insulation paper is partially cut out to expose the outer peripheral surface of the coil end; and wherein the slot insulation paper protrudes from the armature core in the axial direction at both the outer peripheral side and the inner peripheral side.

3. The rotary electric machine as in claim 1, further comprising:

an insulation plate attached to an axial side surface of the armature core, wherein the slot insulation paper protrudes from the insulation plate in the axial direction at both the outer peripheral side and the inner peripheral side of the coil end.

4. The rotary electric machine as in claim 1, wherein a resin insulator is filled between the exposed surface of the coil end and the reinforcing ring.

5. The rotary electric machine as in claim 1, wherein the reinforcing ring is press-fitted in direct contact with the exposed surface of the coil end.

6. The rotary electric machine as in claim 1, further comprising:

a commutator connected to the armature coil; and brushes for slide-contacting the commutator during rotation of the armature.

7. The rotary electric machine as in claim 6, wherein the inner peripheral surface of the coil end is surrounded with the slot insulation paper that protrudes from the armature core in the axial direction.

* * * * *